3,594,171
PHOTOGRAPHIC LIGHT SENSITIVE ELEMENTS

Shiro Kimura, Kazuya Sano, and Kazuo Inoue, Kanagawa, Japan, assignors to Fuji Photo Film Co., Ltd., Kanagawa, Japan
No Drawing. Filed Dec. 22, 1967, Ser. No. 692,707
Claims priority, application Japan, Dec. 22, 1966, 41/84,022
Int. Cl. G03c *1/84*
U.S. Cl. 96—84    2 Claims

ABSTRACT OF THE DISCLOSURE

A photographic light sensitive element comprising a support and at least one layer on said support, one of said layers containing at least one member selected from the group consisting of a photographic filter dye, an anti-irradiation dye and an antihalation dye incorporated in the layer as a solution of the dye in a non-volatile organic solvent which is immiscible with water under the conditions of preparation of said photographic light sensitive element but can be easily dissolved out of said layer under the conditions of processing at a pH higher than 8.5.

BACKGROUND OF THE INVENTION (1) Field of the invention

The present invention relates to a photographic silver halide light sensitive element having a layer containing at least one of a photographic filter dye, an anti-irradiation dye, and an anti-halation dye. More particularly, it relates to a photographic light-sensitive element wherein the fine particles of the solution of aforesaid dye in a hydrophobic solvent is incorporated in a layer of the light sensitive element.

(2) Description of the prior art

In a photographic light sensitive element, a filter dye is used for correcting the color sensitivity of the photographic emulsion layer and an antihalation dye or an anti-irradiation dye is used for absorbing light of harmful color reflected or scattered at the support and/or an emulsion layer or emulsion layers. It is desirable that the color of these dyes does not remain in the emulsion layer after development. Hence, it has usually been attempted to dissolve the dye into the developer or to convert the dye into a colorless compound by the reaction with sulfite ions in the developer.

For example, as dyes which can be dissolved in a developer, there are illustrated tartrazine 1-(p-sulfophenyl) - 3 - carboxy - 4 - (p-sulfophenylazo)-5-hydroxypyrazole trisodium salt, Orange II 1-(p-sulfophenylazo-2-hydroxynaphthol, and the like. Also, as examples of dyes which can be de-colored by the reaction with sulfiite ions, there are illustrated a triphenylmethane dye, a pyrazolone oxonol dye, and the like.

For adding the dye to a coating composition for a light sensitive emulsion layer or adding the dye to a coating layer other than light sensitive emulsion layer, the following methods have hitherto been employed. That is, in the case where the dye is soluble in water, the dye is added directly to the coating composition or is dispersed in the coating composition by using a subsidiary solvent, and in the case where the dye is oil-soluble, the dye is dissolved in a non-volatile solvent which is immiscible in water and the resulting solution is dispersed as an emulson in the coating composition, with the aid of a subsidiary solvent, if necessary.

However, in the method in which the aforesaid water-soluble dye is used, there are such disadvantages that, when the emulsions are coated, the dye diffuses into the adjacent layers to reduce the subjective effects, such as the filtering effect, antihalation effect, anti-irradiation effect, and the like, or else the dye comes into direct contact with the light sensitive material and reduces the sensitivity of the light sensitive material. On the other hand, in the method in which the aforesaid oil-soluble dye is used, there are other disadvantages. Although the aforesaid difficulties caused by the diffusion of the dye may be overcome, it takes a long time to decolorize the dye, since the decoloration reaction during development is a heterogeneous one.

Therefore, an object of the present invention is to provide a photographic silver halide light sensitive element which has a light sensitive emulsion layer or other layer containing a water-soluble or oil-soluble filter dye, antihalation dye or anti-irradiation dye incorporated in the emulsion layer as a solution of the dye in a non-volatile organic solvent which is immiscible with water, yet dissolvable out of the layer under the conditions of processing, and which is not accompanied by the aforesaid disadvantages.

Another object of this invention is to provide a photographic silver halide light sensitive element wherein are overcome the disadvantages of the desensitization of the light sensitive material due to the diffusion of the water-soluble dye.

Still another object of this invention is to provide a photographic light sensitive element wherein there are improved the slow decoloration or the slow dissolution into the developing solution at development, in the case where the usual organic solvent is employed to disperse the said dye together with a subsidiary solvent, if necessary.

SUMMARY OF THE INVENTION

That is, the photographic light sensitive element of this invention has on a support one or more layers containing at least one of a photographic filter dye, an antihalation dye and an anti-irradiation dye incorporated in a finely dispersed form from a solution of the dye in a non-volatile organic solvent which is immiscible with water, under the conditions of preparation of the photographic light sensitive element, but soluble in a developer solution under the conditions of development at the pH higher than 8.5.

DETAILED DESCRIPTION OF THE INVENTION

For preparing the photographic light sensitive element, the dye used in the present invention is dissolved in an organic solvent having the above-mentioned properties (hereinafter, such an organic solvent is called "an alkaliphilic and hydrophobic solvent") directly or with the aid of a subsidiary solvent, the resulting solution is dispersed in a photographic light sensitive emulsion, an aqueous gelatin solution, or the like to provide a coating emulsion, and the emulsion is applied to a support followed by drying to form a subjective layer. In the unprocessed photographic light sensitive element of this invention, the dye is present in the layer as a dispersion of the solution in the aforesaid alkaliphilic and hydrophobic solvent, the dye being protected by the solvent and hence the dye does not diffuse out into other layers, and the photographic properties of the light sensitive emulsion are not altered. This alkaliphilic and hydrophobic solvent is dissolved out of the layer only on development and the dye is released from the protection by the solvent and is easily dissolved out or decolorized.

The alkaliphilic and hydrophobic solvent used in this invention is required to have properties such that the solvent is not dissolved in water, but is easily dissolved in an aqueous solution having a pH higher than 8.5. The solvent also must be non-volatile, have a dissolving power for the solute in question, and have no bad influence on the photographic emulsions.

As an example of the alkaliphilic and hydrophilic solvent fitted to the purpose, there is illustrated a compound represented by the general formula

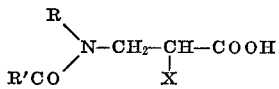

wherein X represents H or a methyl group and R and R' each represents an unsubstituted or substituted alkyl group, the sum of the number of carbon atoms in groups R and R' being an integer from 7 to 11. If the sum of the carbon numbers is less than 7, the solubility in water becomes too large and if it is greater than 11, its dissolution from the layer on development becomes insufficient.

Practical examples of the compound shown above are as follows:

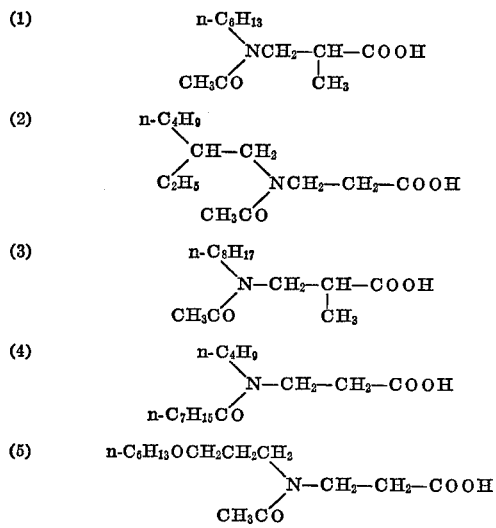

The compounds represented by the above formulas are novel compounds, the preparation of which will be shown after. However, it should be understood that besides the aforesaid general structure, any other alkaliphilic and hydrophobic compounds filling the above-mentioned requirements can be employed in the present invention.

As described above, in the process of this invention the aforesaid dye is dissolved directly into the alkaliphilic and hydrophobic solvent or the dye is dispersed with the aid of a subsidiary solvent. In this case, by the "subsidiary solvent" is meant a solvent used for accelerating the dissolution of the dye, or reducing the viscosity of the solvent, or improving the dispersing property of the solvent. That is the subsidiary solvent may either be one which is soluble in water or volatile, and hence, is removed from the system in the course of the preparation of the photographic light sensitive elements. It may also be one which is immiscible in water or non-volatile and remains in the light sensitive element together with the alkaliphilic and hydrophobic solvent, but is solubilized together with the alkaliphilic and hydrophobic solvent out of the layer on development.

As the examples of the former type of subsidiary solvent, there are illustrated acetone, dimethylformamide, ethyl acetate, methyl ethyl ketone and the like. As the latter type of subsidiary solvent there are illustrated phosphorate esters and phthalate esters, and, especially, the compounds of the following structure, which are particularly easily solubilized and also have a preferable viscosity and dissolving power:

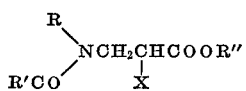

wherein R, R' and X has the same meaning as those shown in the general formula of an example of the aforesaid alkaliphilic and hydrophobic solvent, and R" represents a methyl group or an ethyl group.

Practical examples of the subsidiary solvents shown by the above general formula are shown below. These compounds are intermediates of the synthesis of alkaliphilic and hydrophobic solvents mentioned above.

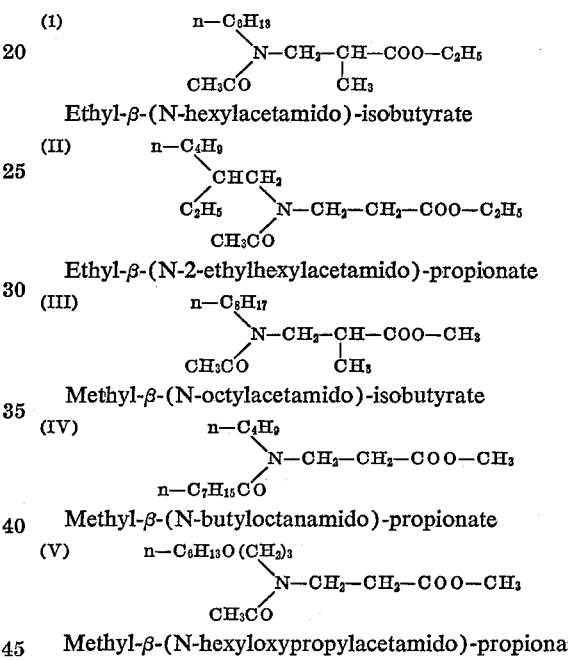

On the other hand, the photographic filter dye, an antihalation dye or an anti-irradiation dye must have the required absorption characteristics, the property of decoloration on development, and a sufficient solubility in the alkaliphilic and hydrophobic solvent used in this invention. As examples are illustrated the following known materials;

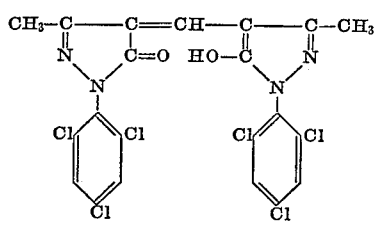

4,4'-bis[3-methyl-1-(2,4,6-trichlorophenyl) - 5 - pyrazolone]-mono-methine oxanol (b)
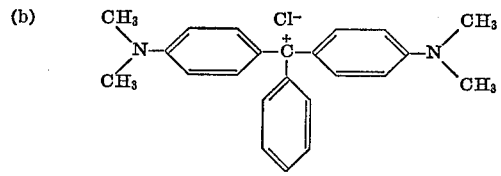

4,4'-bis(dimethylamino)-triphenylmethyl chloride (c) 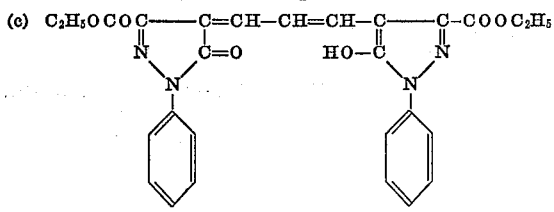

4,4'-bis(3-ethoxycarbonyl-1-phenyl - 5 -pyrazolone)-trimethine oxanol (d) 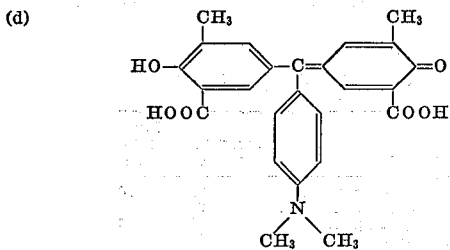

(3-carboxy-4-hydroxy-5-methyl) - phenyl - (4-dimethylamino)-phenyl-(3-carboxy-5-methyl - 4 - oxo)-cyclohexa-2,5-dienylidene methane (e) 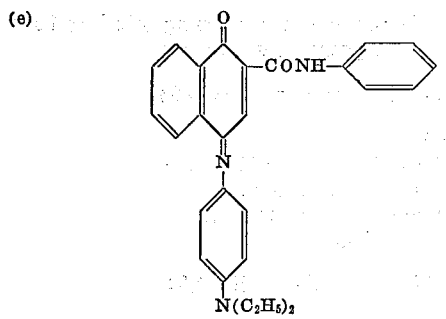

1,4-naphthoquinone-4-(p-diethylaminophenyl) - imine-2-carboxyl anilide

Since the alkaliphilic and hydrophobic solvent usually shows a solubilizing property during development, the dye can easily be solubilized by the organic solvent of this invention, even if the dye is not very easily soluble in the developer solution. Furthermore, since in the process of this invention the aforesaid dye is dissolved in the alkaliphilic and hydrophobic solvent and the resulting solution is added to a gelatin emulsion, the influence of the dye on the light sensitive material is much smaller compared with the direct dispersion of a dye by itself into the emulsion. Therefore, there may be used an anthraquinonic dye or a triphenylmethanic dye which has hitherto been considered to be avoidable for the sake of photographic properties if the requirements on the color density and the usage permits.

Now, examples of preparing aforesaid compounds (1)–(5) as the alkaliphilic and hydrophobic solvents are described below.

Synthesis of Compound 1

A mixture of 101 g. of n-hexylamine and 114 g. of ethyl methacrylate was mixed with 1 g. of sodium ethylate and the resulting mixture was heated for 2 days at 70° C. on a water bath. The product was then distilled under a reduced pressure to provide 148 g. of ethyl-2-hexyl-amino-isobutyrate as a fraction boiling at 91° C./2 mm. Hg.

To the distillate was added dropwise 84 g. of freshly distilled acetic anhydride over a 15 minute period. Thereafter, the mixture was heated for 30 minutes on a water bath and then distilled under a reduced pressure to provide 145 g. of intermediate compound (I) as a fraction having a boiling point of 138–143° C./1 mm. Hg.

The fraction was mixed with 450 ml. of a 2 N aqueous sodium hydroxide solution containing 45 ml. of methanol and the mixture was occasionally shaken at room temperature, whereby heat was generated after a while and the resulting solution became clear. After further shaking for a while, the product was cooled and acidified with concentrated hydrochloric acid, whereby an oily material separated, which was then extracted with ether, washed with water and dried over sodium sulfate. Thereafter, by distilling off the solvent under a reduced pressure, 129 g. of compound (1) was obtained.

Analysis of N in the compound: Found: 6.02%, Calculated: 6.11%.

Synthesis of Compound 2

To 129 g. of 2-ethylhexylamine was added dropwise 100 g. of ethyl acrylate while stirring the system at temperatures below 30° C. After the end of the addition, the system was heated on a warm water bath for one hour and then distilled under a reduced pressure to provide 178 g. of a fraction boiling at 99° C./1 mm. Hg. The product was treated with 92 g. of freshly distilled acetic anhydride as in the preparation of compound (1), and the product was distilled under a reduced pressure to provide 180 g. of compound (II) boiling at 145–150° C./1 mm. Hg. The product was mixed in 500 ml. of an aqueous 2 N sodium hydroxide solution containing 50 ml. of methanol and the mixture was shaken to assist hydrolysis until the product solution became clear. The resulting solution was acidified with hydrochloric acid to prepare an oily material, which was extracted with ether, washed with water, and dried. By removing the solvent from the product in vacuo, 155 g. of compound (2) was obtained.

Analysis of N in the compound: Found: 5.63%, Calculated: 5.76%.

Synthesis of Compound 3

A mixture of 100 g. of n-octylamine and 65 g. of methyl acrylate was mixed with one g. of sodium methylate, and the resulting mixture was allowed to stand for 2 days at about 70° C. on water bath. Then the product was distilled under a reduced pressure to provide 95 g. of an addition product boiling at 107° C./1 mm. Hg. The whole amount of the product was treated with 58 g. of freshly distilled acetic anhydride as in the case of preparing compound (1) and the product thus obtained was distilled under reduced pressure to provide 94 g. of compound (III) as a fraction having a boiling point of 142–145° C./1 mm. Hg. The product was hydrolyzed with 250 ml. of an aqueous 2 N sodium hydroxide solution containing 30 ml. of methanol as in the preparation of compound (1) to provide 78 g. of compound (3).

Analysis of N in the compound: Found: 5.29%. Calculated: 5.45%.

Synthesis of Compound 4

As in the case of preparing compound (2), 88 g. of n-butyl-amine was caused to react with 86 g. of methyl acrylate, and the product was distilled under a reduced pressure to provide 123 g. of a fraction having a boiling point of 64° C./5 mm. Hg. The whole amount of the product was dissolved in 2 liters of ether and the solution was mixed with 100 g. of triethylamine. To the mixture was added dropwise 118 g. of octanoyl chloride under cooling and stirring. After the addition of the chloride, triethylamine hydrochloride was removed by filtration and ether was also removed by distillation to provide compound (IV). The product was hydrolyzed with 400 ml. of an aqueous 2 N sodium solution containing 40 ml. of methanol and the product was extracted as in the preparation of compound (1). Thereafter ether was removed from the system by distillation and the product was distilled under a reduced pressure to provide 50 g. of compound (4) having a boiling point of 195–203° C./3 mm. Hg.

Analysis of N in the compound: Found: 5.23%, Calculated: 5.16%.

Synthesis of Compound 5

As in the case of preparing compound (2), 53 g. of 3-hexyl-oxypropylamine (the synthesis of which is disclosed in Japanese Publication No. 27563/64) now Japanese Patent 450,661 was caused to react with 28 g. of methyl acrylate, and the product thus obtained was distilled under a reduced pressure to provide 71 g. of an addition product boiling at 96° C./1 mm. Hg. The whole amount of the product was mixed with 35 g. of freshly distilled acetic anhydride, and the resulting mixture was heated to 70° C. for 30 minutes and then distilled under a reduced pressure to provide 73 g. of compound (V) as a fraction having a boiling point of 149–158° C./1 mm. Hg. The product was hydrolized with 150 ml. of an aqueous 2 N sodium hydroxide solution containing 15 ml. of methanol, extracted, washed with water, and dried as described in the preparation of compound 1 to provide 61 g. of compound 5 after removing the solvent by distillation.

Analysis of N in the compound: Found: 4.99%, Calculated: 5.13%.

The examples of this invention are shown below, but the invention shall not be limited only to them.

EXAMPLE 1

Into 3 ml. of alkaliphilic and hydrophobic compound (1) was dissolved 0.3 g. of dye (a) with the aid of heat. The resulting solution was dispersed in 100 g. of an aqueous 10% gelatin solution containing one ml. of an aqueous solution of 5% sodium dodecylbenzene sulfonate under vigorous mechanical agitation by means of a homogenizer to provide a yellow emulsion having the absorption maximum at 450 m$\mu$.

To a film base were applied a red-sensitive emulsion containing coupler (k) having the structure shown below, a green-sensitive emulsion containing coupler (m) having the structure shown below, the aforesaid yellow emulsion, and a red-sensitive emulsion containing coupler (n) having the structure shown below, in this order to a dry thickness of 7.0 microns, 5.7 microns, 1.7 microns, and 4.2 microns respectively to provide a multiple layer type photographic light-sensitive color film.

Coupler (k):

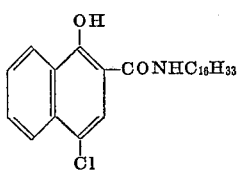

Coupler (m):

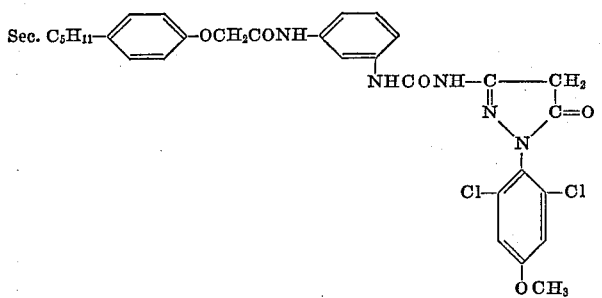

Coupler (n):

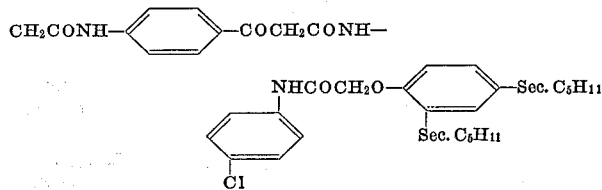

The photographic light sensitive color film was exposed to white light and developed according to the following procedures:

COLOR DEVELOPMENT PROCEDURES

| Procedure | Temperature, ° C. | Time, minutes |
|---|---|---|
| Color development | 21 | 10 |
| Water washing | 21 | 1 |
| Primary fixing | 21 | 4 |
| Water washing | 21 | 3 |
| Bleaching | 21 | 3 |
| Water washing | 21 | 2 |
| Secondary fixing | 21 | 3 |
| Water washing | 18 | 20 |

In the aforesaid procedures, processing solutions having the following compositions were used:

Color Developer pH=10.5)

Water: 1000 ml.
2-amino-5-diethylaminotoluene · HCl: 2.5 g.
Sodium sulfite (anhydrous): 10 g.
Sodium carbonate monohydrate: 47 g.
Potassium bromide: 2 g.

Fixing solution (pH=4.5)

Water: 1000 ml.
Sodium thiosulfate (6H$_2$O): 80 g.
Sodium sulfite: 5 g.
Borax: 6 g.
Glacial acetic acid: 4 ml.
Potassium alum: 7 g.

Bleaching solution (pH=7.2)

Water: 1000 ml.
Potassium ferricyanide: 17 g.
Boric acid: 10 g.
Borax: 5 g.
Potassium bromide: 7 g.

A photographic light sensitive color film was also prepared by the same procedure as above except that compound (1) was replaced with the same amount of dibutyl phthalate, and the color film was developed under the same conditions, whereby the result of the latter was compared with that of the former. The results are shown in Table 1.

TABLE 1.—DISPERSION OF FILTER DYE (a)

|  | Color stain, percent | Relative sensitivity |
|---|---|---|
| Film containing compound 1 | 8 | 1.0 |
| Film containing dibutyl phthalate | 53 | 1.0 |

Throughout this specification, the color stain is shown as the ratio of the density at the maximum visible absorption wavelength of an unexposed portion after processing to that before processing corrected by base density, and the relative sensitivity was shown by the relative value of the reciprocal of the exposure necessary to obtain an optical density of 0.5.

EXAMPLE 2

Application to antihalation dye

In a mixed solvent of 2 ml. of alkaliphilic and hydrophobic compound (2) and 2 ml. of subsidiary solvent compound (1) was dissolved 1.0 g. of aforesaid dye (b), and the resulting solution was dispersed in 100 g. of an aqueous 5% gelatin solution containing 10 ml. of 5% sodium dodecylbenzenesulfonate. The dispersion was applied to the back surface of a film base in a dry thickness of 2 microns and to the opposite surface was applied a black and white negative emulsion in a dry thickness of 14 microns. The black and white photographic film was then developed as shown below.

BLACK AND WHITE DEVELOPMENT PROCEDURES

| Procedure | Temperature, °C. | Time, minutes |
| --- | --- | --- |
| Development | 20 | 8 |
| Water washing | 20 | 1 |
| Fixing | 20 | 5 |
| Water washing | 18 | 10 |

In the above procedures, the processing solutions having the following compositions were used:

Black and white developer (pH=8.7)

Metol(p-methylaminophenyl sulfate): 2 g.
Sodium sulfite (anhydrous): 100 g.
Hydroquinone: 5 g.
Borax: 2 g.
Water: 1000 ml.

Fixing solution: Same as in Example 1.
The results are shown in the following table.

Table 2: Dispersion of antihalation dye (b)

| | Color stain, percent |
| --- | --- |
| Film containing compounds (2) and (I) | 6 |
| Film containing tricresyl phosphate | 39 |

EXAMPLE 3

Application to anti-irradiation dye

Into 0.7 ml. of alkaliphilic and hydrophobic compound (3) was dissolved 0.1 g. of aforesaid dye (d) by using a subsidiary solvent of one ml. of methanol and 0.5 ml. of compound (III), and the resulting solution was dispersed colloidally in 100 g. of a black and white emulsion by means of a homogenizer and applied to a photographic plate to a dry thickness of 14 microns.

On the other hand, the same dye was dissolved in 5 ml. of methanol, the solution was directly dispersed in the same emulsion as above, and the emulsion thus obtained was applied to a plate as in the above procedure. Further, the same dye was dissolved in 1.2 ml. of dibutylphthalate by using 5 ml. of methanol as the subsidiary solvent, the solution was dispersed in the same emulsion, and the dispersion was applied to a dry plate as in the above procedure. The three photographic light sensitive plates thus prepared were exposed and subjected to black and white development according to the same procedures as in Example 2. The results are shown in Table 3.

TABLE 3.—DISPERSION OF ANTI-IRRADIATION DYE (d)

| | Color stain, percent | Relative sensitivity |
| --- | --- | --- |
| Dispersion by compounds 3 and III | 6 | 1.0 |
| Direct dispersion | 8 | 0.5 |
| Dispersion by dibutylphthalate | 44 | 1.1 |

EXAMPLE 4

Combination

The emulsion having the following compositions were applied to a film base in the order of A, B, C, D and E, followed by drying.

(A) Into 2 ml. of alkaliphilic and hydrophobic compound (5) was dissolved 0.5 g. of aforesaid dye (c) by using 5 ml. of methanol as the subsidiary solvent, the resulting solution was dispersed in 100 ml. of an aqueous 5% gelatin solution containing 10 ml. of 5% sodium dodecylbenzene sulfonate, and the dispersion thus prepared was applied to the film base to a dry thickness of 1.0 micron.

(B) Into a subsidiary solvent mixture of 1 ml. of methanol and 0.6 ml. of compound (II) was dissolved 0.1 g. of aforesaid dye (e), and the resulting solution, after addition to 0.4 g. of compound (4), was dispersed in 100 g. of the red-sensitive emulsion containing coupler (k) as in Example 1, and the dispersion was applied to a dry thickness of 7.0 microns.

(C) Into 0.7 g. of subsidiary solvent compound (V) was dissolved 0.1 g. of aforesaid dye (c). The resulting solution was added to 0.7 g. of compound (1) and the mixture was dispersed in 100 g. of the red-sensitive emulsion containing coupler (m) as shown in Example 1, and the dispersion was applied to a dry thickness of 6.0 microns.

(D) Into 2 ml. of alkaliphilic and hydrophobic compound (1) was dissolved 0.3 g. of dye (a) by using as a subsidiary solvent 1 ml. of compound (1) and 2 ml. of methanol, the resulting solution was dispersed in 100 g. of an aqueous 10% gelatin solution containing 1 ml. of 5% sodium dodecylbenzene sulfonate, and the dispersion was applied to a dry thickness of 2.0 microns.

(E) The blue-sensitive emulsion containing coupler (n) having the same composition as in Example 1 was applied to a thickness of 4.2 microns.

Multiple layer type photographic light sensitive color film thus obtained was exposed and developed by the same manner as in Example 1.

The color stain at the unexposed portion in a wavelength region of 400–700 mμ, subtracted by the base density did not exceed 0.04.

What is claimed is:

1. A photographic silver halide light sensitive element comprising a support and at least one layer on said support, one of said layers containing at least one dye consisting of a photographic filter dye, an anti-irradiation dye or an antihalation dye selected from the group consisting of a pyrazolone oxanol dye, a triphenylmethane dye, and an integer from 7 to 11, said solvent being immiscible with layer as a solution of the dye in a non-volatile organic solvent represented by the general formula

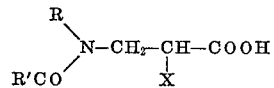

wherein X represents a member selected from the group consisting of H and a methyl group, R and R' each represents a member selected from the group consisting of an unsubstituted alkyl group and a substituted alkyl group, and the total number of carbon atoms in said R and R' is an integer from 7 to 11, said solvent being immiscible with water under the conditions of preparation of said photographic light sensitive element but being easily dissolved out of said layer under the conditions of processing at a pH higher than 8.5.

2. The element of claim 1 wherein said dye is incorporated in said non-volatile organic solvent in the presence of a subsidiary solvent represent by the general formula

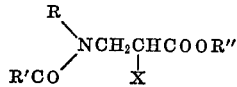

wherein X represents a member selected from the group consisting of H and a methyl group, each of R and R' represents a member selected from the group consisting of an unsubstituted alkyl group and a substituted alkyl group, the total number of carbons in R and R' is an integer of from 7 to 11, and R" is a member selected from the group consisting of a methyl group and an ethyl group.

References Cited

UNITED STATES PATENTS

| | | | |
|---|---|---|---|
| 2,294,893 | 9/1942 | Carroll et al. | 96—84 |
| 3,018,178 | 1/1962 | Harriman | 117—34X |
| 3,113,026 | 12/1963 | Sprung | 260—534X |

FOREIGN PATENTS

| | | | |
|---|---|---|---|
| 611,556 | 11/1948 | Great Britain | 96—84 |
| 869,138 | 5/1969 | Great Britain | 96—84 |
| 577,921 | 6/1959 | Canada | 260—534 |
| 40/571 | 5/1965 | Japan | 260—482 |
| 728,137 | 2/1966 | Canada | 260—534 |

WILLIAM D. MARTIN, Primary Examiner

M. R. P. PERRONE, JR., Assistant Examiner

U.S. Cl. X.R.

96—109; 117—34; 260—482, 534